(12) United States Patent
Dai et al.

(10) Patent No.: US 11,703,981 B2
(45) Date of Patent: Jul. 18, 2023

(54) TOUCH DISPLAY PANEL

(71) Applicant: TCL CHINA STAR OPTOELECTRONICS TECHNOLOGY CO., LTD., Shenzhen (CN)

(72) Inventors: Aimin Dai, Shenzhen (CN); Hao Zhao, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 268 days.

(21) Appl. No.: 17/264,813

(22) PCT Filed: Dec. 9, 2020

(86) PCT No.: PCT/CN2020/134939
§ 371 (c)(1),
(2) Date: Jan. 30, 2021

(87) PCT Pub. No.: WO2022/110310
PCT Pub. Date: Jun. 2, 2022

(65) Prior Publication Data
US 2022/0397978 A1    Dec. 15, 2022

(30) Foreign Application Priority Data

Nov. 27, 2020    (CN) .......................... 202011363861.8

(51) Int. Cl.
*G06F 3/042* (2006.01)
*G06F 3/041* (2006.01)

(52) U.S. Cl.
CPC .......... *G06F 3/0428* (2013.01); *G06F 3/0412* (2013.01); *G06F 2203/04107* (2013.01)

(58) Field of Classification Search
CPC ....... G06F 3/041; G06F 3/0412; G06F 3/0428
USPC ......................................................... 345/175
See application file for complete search history.

(56) References Cited

U.S. PATENT DOCUMENTS

2004/0140961 A1* 7/2004 Cok ........................ H10K 59/40
345/175
2012/0256882 A1* 10/2012 Christiansson ....... G06F 3/0418
345/175
2020/0097699 A1* 3/2020 Zeng ....................... H10K 50/86
(Continued)

FOREIGN PATENT DOCUMENTS

| CN | 102467299 A | 5/2012 |
| CN | 104160366 A | 11/2014 |
| CN | 110045867 A | 7/2019 |

(Continued)

*Primary Examiner* — Calvin C Ma
(74) *Attorney, Agent, or Firm* — PV IP PC; Wei Te Chung; Zhigang Ma

(57) ABSTRACT

The present application provides a touch display panel. In the touch display panel, a frame is provided with a first accommodation space, a first accommodation slot, and a second accommodation slot; a display pane disposed in the first accommodation space, infrared emitting modules disposed in the first accommodation slot and at a periphery of a light-emitting side of the display panel; and infrared receiving modules disposed in the second accommodation slot and at the periphery of the light-emitting side of the display panel.

20 Claims, 2 Drawing Sheets

(56) References Cited

U.S. PATENT DOCUMENTS

2021/0247871 A1* 8/2021 Kim .................. H01Q 1/526
2021/0349501 A1* 11/2021 Chen .................. G06F 3/0412

FOREIGN PATENT DOCUMENTS

| | | | |
|---|---|---|---|
| CN | 110134291 | A | 8/2019 |
| CN | 110231891 | A | 9/2019 |
| CN | 111061391 | A | 4/2020 |
| CN | 210895387 | U | 6/2020 |
| CN | 111766968 | A | 10/2020 |
| KR | 20180111287 | A | 10/2018 |
| WO | 2011078769 | A1 | 6/2011 |

* cited by examiner

TOUCH DISPLAY PANEL

RELATED APPLICATIONS

This application is a Notional Phase of PCT Patent Application No. PCT/CN2020/134939 having international filing date of Dec. 9, 2020, which claims the benefit of priority of Chinese Patent Application No. 202011363861.8 filed on Nov. 27, 2020. The contents of the above applications are all incorporated by reference as if fully set forth herein in their entirety.

BACKGROUND OF INVENTION

Field of Invention

The present application relates to the field of display technology, and in particular, to a touch display panel.

Description of Prior Art

In the traditional infrared touch screen, a glass cover plate is bonded to an upper surface of the liquid crystal display, an infrared frame is installed around the glass cover plate, and a part of the infrared frame protruding from the glass cover is equipped with an infrared emitting tube and an infrared receiving tube. When working, infrared light at a position wherein a finger or an object touches the glass cover plate is blocked, and the corresponding infrared receiving tube has no light entering, thereby determining the position of a touch point.

However, with such technology, the infrared emitting tube and the infrared receiving tube are protruding, resulting in defects of being vulnerable to external light interference, polluted by environment, and prone to damage due to collision, while the beauty of the touch screen is also impacted.

SUMMARY OF INVENTION

An embodiment of the present application provides a touch display panel to solve the technical problem that the existing touch screen is easily damaged by collision.

An embodiment of the present application provides a touch display panel, which includes:

a frame provided with a first accommodation space, first accommodation slots cut in a side wall of the frame, and second accommodation slots cut in an opposite side wall of the frame, wherein the first accommodation slot and the second accommodation slot are disposed above the first accommodation space;

a display panel disposed in the first accommodation space;

infrared emitting modules disposed in the first accommodation slot and at a periphery of a light-emitting side of the display panel;

infrared receiving modules disposed in the second accommodation slot and at the periphery of the light-emitting side of the display panel; and a transparent layer disposed on the display panel and a protective layer disposed on the transparent layer, wherein the transparent layer is disposed between the infrared emitting modules and the infrared receiving modules, and light-emitting surfaces of the infrared emitting modules directly face the transparent layer.

In the touch display panel according to an embodiment of the present application, the transparent layer is formed of a transparent material and fully bonded and connected to the display panel.

In the touch display panel according to an embodiment of the present application, the transparent layer is fully bonded to the display panel through an adhesive layer.

In the touch display panel according to an embodiment of the present application, the transparent layer includes a plurality of supporting members, and an air layer is disposed between adjacent ones of the supporting members.

In the touch display panel according to an embodiment of the present application, the display panel includes a black matrix, and an orthographic projection of the supporting member on a plane where the display panel is located falls within an orthographic projection of the black matrix on the plane where the display panel is located.

In the touch display panel according to an embodiment of the present application, the frame includes a first side wall, a second side wall, a third side wall, and a fourth side wall that are connected end to end in sequence, the first side wall is disposed opposite to the third side wall, and the second side wall is disposed opposite to the fourth side wall;

the first accommodation slot is opened in the first side wall and the second side wall, and the second accommodation slot is opened in the third side wall and the fourth side wall; and two of the infrared emitting modules are disposed in the two first accommodation slots in a one-to-one correspondence, and two of the infrared receiving modules are disposed in the two second accommodation slots in a one-to-one correspondence.

In the touch display panel according to an embodiment of the present application, a second accommodation space and a third accommodation space that are sequentially connected to the first accommodation space are provided in the frame, and the second accommodation space is communicated with and disposed in a same layer as the first accommodation slot and the second accommodation slot, respectively; and the transparent layer is disposed in the second accommodation space, and the protective layer is disposed in the third accommodation space.

In the touch display panel according to an embodiment of the present application, a hardening layer is disposed on a side of the protective layer facing away from the display panel.

In the touch display panel according to an embodiment of the present application, the touch display panel includes a light-shielding ring disposed between the protective layer and the frame.

Another embodiment of the present application provides a touch display panel, which includes:

a frame provided with a first accommodation space, first accommodation slots cut in a side wall of the frame, and second accommodation slots cut in an opposite side wall of the frame, wherein the first accommodation slot and the second accommodation slot are disposed above the first accommodation space;

a display panel disposed in the first accommodation space;

infrared emitting modules disposed in the first accommodation slot and at a periphery of a light-emitting side of the display panel; and infrared receiving modules disposed in the second accommodation slot and at the periphery of the light-emitting side of the display panel.

In the touch display panel according to an embodiment of the present application, the touch display panel includes a transparent layer disposed on the display panel and a protective layer disposed on the transparent layer, wherein the transparent layer is disposed between the infrared emitting modules and the infrared receiving modules.

In the touch display panel according to an embodiment of the present application, the transparent layer is formed of a transparent material and fully bonded and connected to the display panel.

In the touch display panel according to an embodiment of the present application, the transparent layer is fully bonded to the display panel through an adhesive layer.

In the touch display panel according to an embodiment of the present application, the transparent layer includes a plurality of supporting members, and an air layer is disposed between adjacent ones of the supporting members.

In the touch display panel according to an embodiment of the present application, the display panel includes a black matrix, and an orthographic projection of the supporting member on a plane where the display panel is located falls within an orthographic projection of the black matrix on the plane where the display panel is located.

In the touch display panel according to an embodiment of the present application, the supporting member are arranged in a grid shape.

In the touch display panel according to an embodiment of the present application, the frame includes a first side wall, a second side wall, a third side wall, and a fourth side wall that are connected end to end in sequence, the first side wall is disposed opposite to the third side wall, and the second side wall is disposed opposite to the fourth side wall;

the first accommodation slot is opened in the first side wall and the second side wall, and the second accommodation slot is opened in the third side wall and the fourth side wall; and two of the infrared emitting modules are disposed in the two first accommodation slots in a one-to-one correspondence, and two of the infrared receiving modules are disposed in the two second accommodation slots in a one-to-one correspondence.

In the touch display panel according to an embodiment of the present application, a second accommodation space and a third accommodation space that are sequentially connected to the first accommodation space are provided in the frame, and the second accommodation space is communicated with and disposed in a same layer as the first accommodation slot and the second accommodation slot, respectively; and the transparent layer is disposed in the second accommodation space, and the protective layer is disposed in the third accommodation space.

In the touch display panel according to an embodiment of the present application, a hardening layer is disposed on a side of the protective layer facing away from the display panel.

In the touch display panel according to an embodiment of the present application, the touch display panel includes a light-shielding ring disposed between the protective layer and the frame.

In the touch display panel of the present application, the infrared emitting modules and the infrared receiving modules are arranged in the first accommodation slot and the second accommodation slot on a side wall of the frame, thereby preventing the infrared emitting modules and the infrared receiving modules from protruding, thus protecting the infrared emitting modules and infrared receiving modules.

BRIEF DESCRIPTION OF DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

DETAILED DESCRIPTION OF PREFERRED EMBODIMENTS

Figure 1:
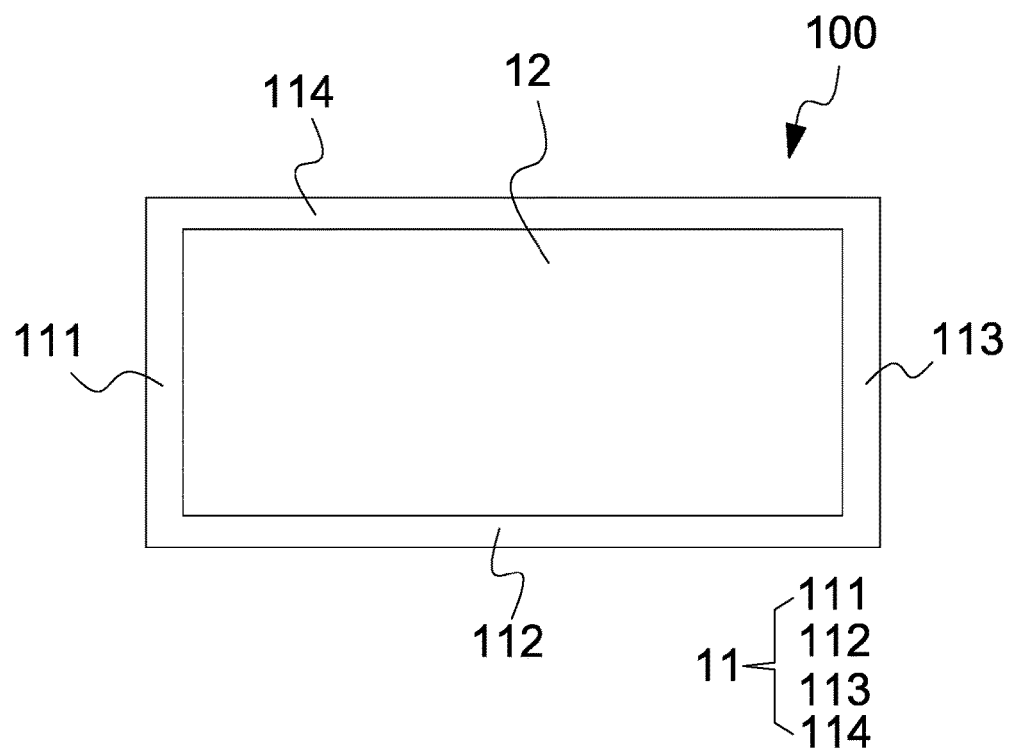
FIG. 1 is a schematic structural top view of a touch display panel according to Embodiment 1 of the application.

The technical solutions in the embodiments of the present application will be clearly and completely described in the following with reference to the accompanying drawings in the embodiments. It is apparent that the described embodiments are only a part of the embodiments of the present application, and not all of them. All other embodiments obtained by a person skilled in the art based on the embodiments of the present application without creative efforts are within the scope of the present application.

In the description of this application, it should be understood that the terms "center", "longitudinal", "transverse", "length", "width", "thickness", "upper", "lower", "front", "Rear", "left", "right", "vertical", "horizontal", "top", "bottom", "inside", "outside", "clockwise", "counterclockwise", and the like are based on the orientation or positional relationship shown in the drawings, and is merely for the convenience of describing the present invention and simplifying the description, rather than indicating or implying that the device or element referred to must have a specific orientation, structure and operation in a specific orientation, which should not be construed as limitations on the present invention. In addition, the terms "first" and "second" are used for descriptive purposes only, and cannot be understood as indicating or implying relative importance or implicitly indicating the number of technical features indicated. Therefore, the features defined as "first" and "second" may explicitly or implicitly include one or more of the features. In the description of the present application, the meaning of "a plurality" is two or more, unless specifically defined otherwise.

In the description of this application, it should be noted that the terms "installation", "connected", and "connected" should be understood in a broad sense unless explicitly stated and limited otherwise. For example, it can be a fixed connection, a detachable connection, or an integral connection; it can also be a mechanical connection or an electrical connection; it can be a direct connection; or it can be an indirect connection through an intermediate medium; or it can be a communication between two components.

In the present invention, unless otherwise expressly stated and limited, the formation of a first feature over or under a second feature in the description that follows may include embodiments in which the first and second features are formed in direct contact, and may also include embodiments in which additional features may be formed between the first and second features, such that the first and second features may not be in direct contact. Moreover, the first feature "above", "over" and "on" the second feature includes the first feature directly above and above the second feature, or merely indicating that the first feature is at a level higher than the second feature. The first feature "below", "under" and "beneath" the second feature includes the first feature directly below and obliquely below the second feature, or merely the first feature has a level lower than the second feature.

The following disclosure provides many different embodiments or examples for realizing different structures of the present application. To simplify the disclosure of the present application, the components and settings of specific examples are described below. Of course, they are only examples and are not intended to limit the application. In addition, the present application may repeat reference numerals and/or reference letters in different examples. Such repetition is for the purpose of simplification and clarity, and does not indicate the relationship between the various embodiments and/or settings discussed. In addition, this application provides examples of various specific processes and materials, but those of ordinary skill in the art may be aware of the applications of other processes and/or the use of other materials.

Figure 2:
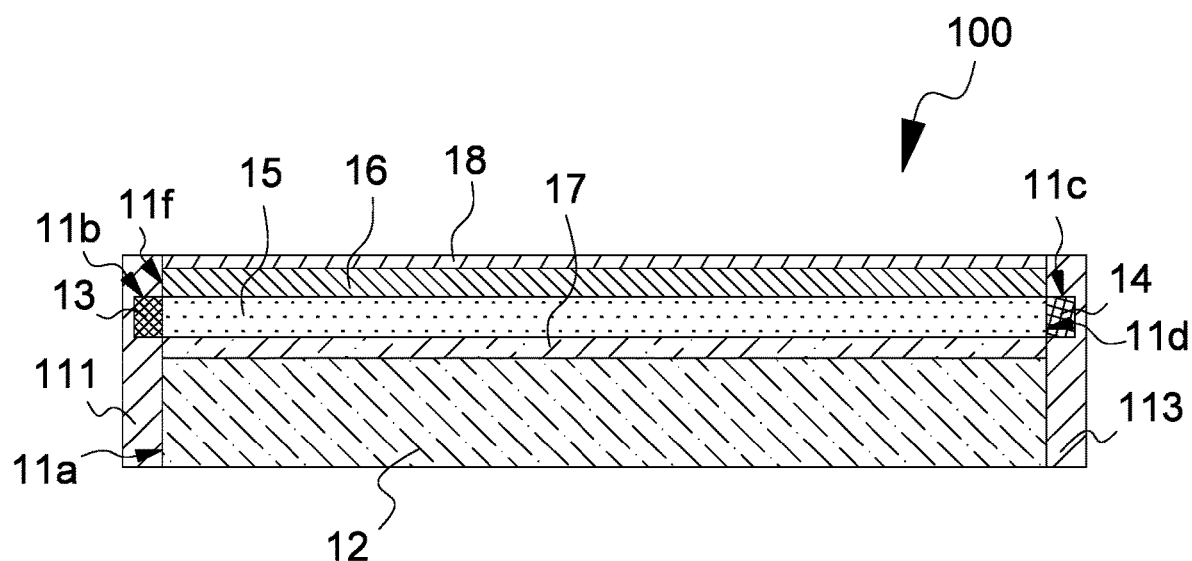
FIG. 2 is a schematic structural cross-sectional diagram of the touch display panel according to Embodiment 1 of the application.

Referring FIG. 1 and FIG. 2, FIG. 1 is a schematic structural top view of a touch display panel according to Embodiment 1 of the application; and FIG. 2 is a schematic structural cross-sectional diagram of the touch display panel according to Embodiment 1 of the application.

An embodiment of the present application provides a touch display panel 100, which includes a frame 11, a display panel 12, infrared emitting modules 13, infrared receiving modules 14, a transparent layer 15, and a protective layer 16.

The frame 11 is provided with a first accommodation space 11a, a first placing slot 11b opened a side wall of the frame 11, and a second placing slot 11c opened on an opposite side wall of the frame 11. The first accommodation slot 11b and the second accommodation slot 11c are arranged above the first accommodation space 11a.

The display panel 12 is disposed in the first accommodation space 11a.

The infrared emitting modules 13 is disposed in the first accommodation slot 11b and at a periphery of a light-emitting side of the display panel 12.

The infrared receiving modules 14 is disposed in the second accommodation slot 11bc and at the periphery of the light-emitting side of the display panel 12

The transparent layer disposed on the display panel and a protective layer disposed on the transparent layer, The infrared receiving modules 14 is arranged in the second accommodation slot 11c, and the infrared receiving modules 14 is arranged on the periphery of the light-emitting side of the display panel 11.

In the touch display panel 100 of Embodiment 1, the infrared emitting modules 13 and the infrared receiving modules 14 are arranged in the first accommodation slot 11b and the second accommodation slot 11c on a side wall of the frame 11, thereby preventing the infrared emitting modules 13 and the infrared receiving modules 14 from protruding, thus protecting the infrared emitting modules 13 and infrared receiving modules 14.

In the touch display panel 100 of Embodiment 1, the touch display panel 100 includes a transparent layer 15 provided on the display panel 100 and a protective layer 16 provided on the transparent layer 15.

The transparent layer 15 is arranged between the infrared emitting modules 13 and the infrared receiving modules 14 to protect the infrared emitting modules 13 and the infrared receiving structure 14. Further, a light-emitting surface of the infrared emitting modules 13 faces the transparent layer 15, and a light incident surface of the infrared receiving modules 14 faces the transparent layer 15.

The transparent layer 15 is formed of a transparent material, and the transparent layer 15 is fully bonded and connected to the display panel 11.

Specifically, the transparent material is a stable substance, such as a resin, optional PET, that is not affected or less affected by an electric field, a magnetic field, and light. The protective layer 16 is also made of a transparent material, such as PET, but is not particularly limited thereto.

The transparent layer 15 is fully bonded to the display panel 11 through an adhesive layer 17. Optionally, the adhesive layer 17 may be made of a material including an ultraviolet curing glue, a hot melt glue, and/or other transparent glue.

The transparent layer 15 is arranged on the display panel 11 in a fully bonded manner, so that infrared rays only travel in a same medium during a propagation process, which reduces a probability of light refraction and reflection, and improves accuracy of touch control.

In some embodiments, the transparent layer 15 and the adhesive layer 17 can be integrated, that is, the adhesive layer 17 is saved. The transparent layer 15 is made of the material of the adhesive layer, so that the transparent layer 15 is used for bonding the display panel 12, and can protect the infrared emitting modules 13 and the infrared receiving structure 14.

Specifically, in the touch display panel 100 of Embodiment 1, the frame 11 includes a first side wall 111, a second side wall 112, a third side wall 113, and a fourth side wall 114 that are connected end to end in sequence. The first side wall 111 and the third side wall 113 are disposed oppositely, and the second side wall 112 and the fourth side wall 114 are disposed oppositely.

The first accommodation slot 11b is opened in the first side wall 111 and the second side wall 112, and the second accommodation slot 11c is opened in the third side wall 113 and the fourth side wall 114.

Two of the infrared emitting modules 13 are arranged in the two first accommodation slots 11b in a one-to-one correspondence. two of the infrared receiving modules 14 are arranged in the two second accommodation slots 11c in a one-to-one correspondence.

Of course, in some embodiments, the frame 11 may also have another shape, such as a hexagon, an octagon, etc., but it is not particularly limited thereto.

The frame 11 is provided with a second accommodation space 11d and a third accommodation space 11f that are sequentially connected to the first accommodation space 11a. The second accommodation space 11d is communicated with and disposed in a same layer as the first accommodation slot 11b and the second accommodation slot 11c, respectively.

The transparent layer 15 is disposed in the second accommodation space 11d, and the protective layer 16 is disposed in the third accommodation space 11f.

That is, the transparent layer 15, the infrared emitting modules 13, and the infrared receiving modules 14 are arranged in a same layer, so that the light emitted by the infrared emitting modules 13 propagates in the transparent layer 15.

In the touch display panel 100 of Embodiment 1, the protective layer 16 is provided with a hardening layer 18 on a side facing away from the display panel. The hardened layer 18 is formed on a surface of the protective layer 16 to prevent the protective layer 16 from being scratched.

The working principle of the touch display panel 100 of Embodiment 1 is as follows:

When the touch display panel 100 is working normally, if no foreign object touches the surface of the touch display panel 100, all the infrared receiving modules 14 can normally receive the infrared rays emitted by the infrared emitting modules 13; and when a foreign object touches the surface of the touch display panel 100, a contact position is slightly deformed. Because the infrared emitting modules 13 and the infrared receiving modules 14 are installed close to a bottom surface of the protective layer 16, when a slight deformation occurs, the infrared rays at this position are partially blocked, and an infrared signal received by the infrared receiving modules 14 is interrupted or reduced. If the signal is decreased to be lower than threshold, the position can be determined to be touched. The device can be used with different drive scanning algorithms to achieve multi-touch.

In addition, the touch display panel 100 of Embodiment 1 is prepared using a full bonding technology. Specifically, first, a hardening treatment is performed on a surface of the protective layer 16 to form the hardened layer 18, and then a transparent material is coated on a surfaced of the protective layer 16 facing away from the hardened layer 18 to form the transparent layer 15; secondly, the above structure is taken as a whole and fully bonded to the display panel 12 through the adhesive layer 17.

Alternatively, the transparent layer 15 is fully bonded to the display panel 12 through the adhesive layer 17 first, and then the protective layer 16 with the hardened layer 18 thereon is bonded to the transparent layer 17.

Next, the infrared emitting modules 13 is placed in the first accommodation slot 11b of the frame 11, and the infrared receiving modules 14 is placed in the second accommodation slot 11c of the frame 11.

Finally, the frame 11 is fixedly installed around the display panel 12, so that the display panel 12 is arranged in the first accommodation space 11a of the frame 11, the transparent layer 15 is placed in the second accommodation space 11d, and the protective layer 16 is placed in the third accommodation space. 11f.

As such, the process of manufacturing the touch display panel 100 of Embodiment 1 is completed.

Figure 3:
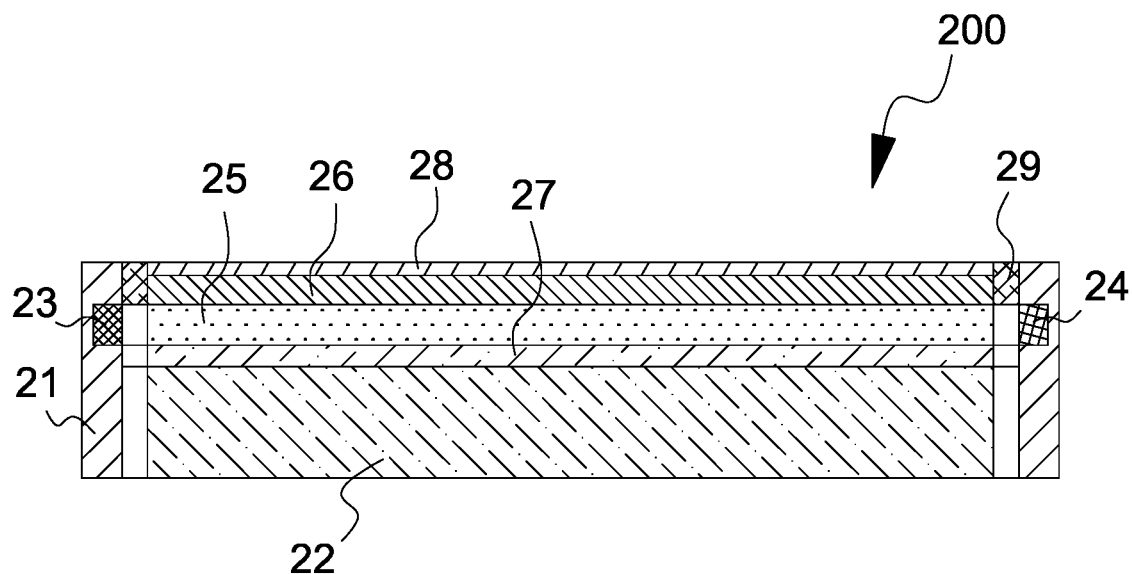
FIG. 3 is a schematic structural diagram of a touch display panel according to Embodiment 2 of the application.

Referring to FIG. 3, the touch display panel 200 of Embodiment 2 includes a frame 21, a display panel 22, infrared emitting modules 23, infrared receiving modules 24, a transparent layer 25, a protective layer 26, an adhesive layer 27, and a hardened layer 28. The touch display panel 200 of Embodiment 2 is further provided with a light-shielding ring 29 on the basis of the touch display panel 100 of Embodiment 1.

Specifically, the touch display panel 200 includes a light-shielding ring 29 disposed between the protective layer 26 and the frame 21.

Specifically, the light-shielding ring 29 may also extend between the hardened layer 28 and the frame 21. The light-shielding ring 29 is made of black light-shielding glue. The light-shielding ring 29, on the one hand, is fixedly connected to the frame 21 and the protective layer 26 and/or the hardened layer 28, thereby improving the stability and sealing of the connection between at least one of the protective layer 26 and the hardened layer 28 and the frame 21; and on the other hand, reduces the interference of external stray light on the infrared receiving modules 24.

The preparation process of the light-shielding ring 29 is to fill a gap between the hardened layer 28 and the frame 21 with light-shielding glue to form the light-shielding ring 29.

Figure 4:
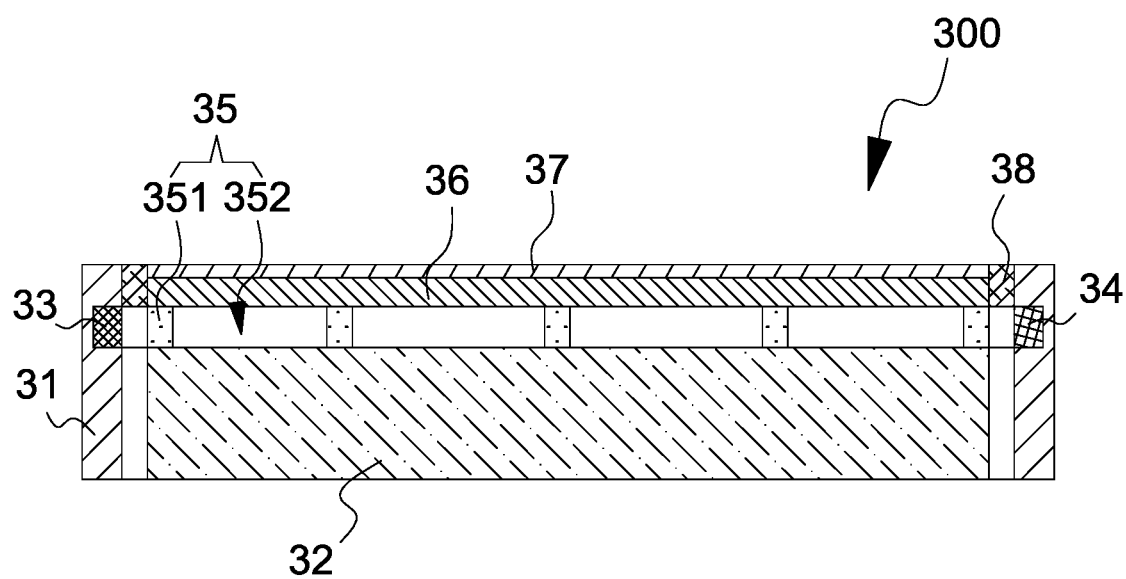
FIG. 4 is a schematic structural diagram of the touch display panel according to Embodiment 3 of the application.

Referring to FIG. 4, the touch display panel 300 of Embodiment 3 includes a frame 31, a display panel 32, infrared emitting modules 33, infrared receiving modules 34, a transparent layer 35, a protective layer 36, a hardened layer 37, and a light-shielding ring 38.

The difference between the touch display panel 300 of Embodiment 3 and the touch display panel 100 of Embodiment 1 or the touch display panel 200 of Embodiment 2 is that the transparent layer 35 includes supporting members 351, and an air layer 352 is provided between adjacent ones of the supporting members 351.

The supporting members 351 achieve a purpose of supporting the protective layer 36, so that the gap between the protective layer 36 and the display panel 32 is kept consistent, and the touch accuracy is improved. In addition, since the transparent layer 35 has an air layer 352, on the one hand, transparent materials are saved, and on the other hand, attenuation of infrared rays in their propagation process is reduced, thereby improving touch sensitivity.

Further, the display panel 32 includes a black matrix (not shown), and an orthographic projection of the supporting member 351 on the plane where the display panel 32 is located is located on the front of the black matrix on the plane where the display panel 32 is located. Within the projection. Since the black matrix is an existing technology in the display panel, it will not be repeated here.

Optionally, the supporting members 351 are arranged in a grid shape, and the supporting members 351 are in a strip shape and arranged in a row direction or a column direction; other shapes and other arrangements of the supporting members 351 are also possible, which are not particularly limited herein.

Such an arrangement improves the display effect of the display panel 32.

In addition, in the touch display panel 300 of Embodiment 3, compared with the touch display panel 100 of Embodiment 1, the touch display panel 300 saves the adhesive layer connected between the transparent layer 35 and the display panel 32. In other words, the supporting members 351 in the transparent layer 35 are made of a transparent adhesive material. This arrangement not only saves materials, but also reduces the thickness of the touch display panel 300.

The manufacturing process and working principle of the touch display panel 300 of Embodiment 3 are similar to or the same as those of the touch display panel 100 of Embodiment 1, and will not be repeated herein for brevity.

In the touch display panel of the present application, the infrared emitting modules and the infrared receiving modules are arranged in the first accommodation slot and the second accommodation slot on a side wall of the frame, thereby preventing the infrared emitting modules and the infrared receiving modules from protruding, thus protecting the infrared emitting modules and infrared receiving modules.

The touch display panel provided in the embodiments of the present application has been described in detail above. Specific examples are used in this document to explain the principles and implementation of the present invention. The descriptions of the above embodiments are only for understanding the method of the present invention and its core ideas, to help understand the technical solution of the present application and its core ideas, and a person of ordinary skill in the art should understand that it can still modify the technical solution described in the foregoing embodiments, or equivalently replace some of the technical features. Such modifications or replacements do not depart the spirit of the corresponding technical solutions beyond the scope of the technical solutions of the embodiments of the present application.

What is claimed is:

1. A touch display panel, comprising:
   a frame provided with a first accommodation space, first accommodation slots cut in a sidewall of the frame, and second accommodation slots cut in an opposite sidewall of the frame, wherein the first accommodation slot and the second accommodation slot are disposed above the first accommodation space;
   a display panel disposed in the first accommodation space;
   infrared emitting modules disposed in the first accommodation slots and at a periphery of a light-emitting side of the display panel;
   infrared receiving modules disposed in the second accommodation slots and at the periphery of the light-emitting side of the display panel; and
   a transparent layer disposed on the display panel and a protective layer disposed on the transparent layer,
   wherein the transparent layer is disposed between the infrared emitting modules and the infrared receiving modules, and light-emitting surfaces of the infrared emitting modules directly face the transparent layer.

2. The touch display panel according to claim 1, wherein the transparent layer is formed of a transparent material and fully attached and connected to the display panel.

3. The touch display panel according to claim 2, wherein the transparent layer is fully attached to the display panel through an adhesive layer.

4. The touch display panel according to claim 1, wherein the transparent layer comprises a plurality of supporting members, and an air layer is disposed between adjacent ones of the supporting members.

5. The touch display panel according to claim 4, wherein the display panel comprises a black matrix, and an orthographic projection of the supporting members on a plane where the display panel is located falls within an orthographic projection of the black matrix on the plane where the display panel is located.

6. The touch display panel according to claim 1, wherein the frame comprises a first sidewall, a second sidewall, a third sidewall, and a fourth sidewall that are connected end to end in sequence, the first sidewall is disposed opposite to the third sidewall, and the second sidewall is disposed opposite to the fourth sidewall;
   the first accommodation slots are provided in the first sidewall and the second sidewall, and the second accommodation slots are provided in the third sidewall and the fourth sidewall; and
   two of the infrared emitting modules are disposed in the two first accommodation slots in a one-to-one correspondence, and two of the infrared receiving modules are disposed in the two second accommodation slots in a one-to-one correspondence.

7. The touch display panel according to claim 1, wherein a second accommodation space and a third accommodation space that are sequentially connected to the first accommodation space are provided in the frame, and the second accommodation space is communicated with and disposed in a same layer as the first accommodation slot and the second accommodation slot, respectively; and
   the transparent layer is disposed in the second accommodation space, and the protective layer is disposed in the third accommodation space.

8. The touch display panel according to claim 1, wherein a hardening layer is disposed on a side of the protective layer facing away from the display panel.

9. The touch display panel according to claim 1, further comprising a light-shielding ring disposed between the protective layer and the frame.

10. A touch display panel, comprising:
    a frame provided with a first accommodation space, a first accommodation slot cut in a sidewall of the frame, and a second accommodation slot cut in an opposite sidewall of the frame, wherein the first accommodation slot and the second accommodation slot are disposed above the first accommodation space;
    a display panel disposed in the first accommodation space;
    infrared emitting modules disposed in the first accommodation slot and at a periphery of a light-emitting side of the display panel; and
    infrared receiving modules disposed in the second accommodation slot and at the periphery of the light-emitting side of the display panel.

11. The touch display panel according to claim 10, further comprising a transparent layer disposed on the display panel and a protective layer disposed on the transparent layer,
    wherein the transparent layer is disposed between the infrared emitting modules and the infrared receiving modules.

12. The touch display panel according to claim 11, wherein the transparent layer is formed of a transparent material and fully attached and connected to the display panel.

13. The touch display panel according to claim 12, wherein the transparent layer is fully attached to the display panel through an adhesive layer.

14. The touch display panel according to claim 11, wherein the transparent layer comprises a plurality of supporting members, and an air layer is disposed between adjacent ones of the supporting members.

15. The touch display panel according to claim 14, wherein the display panel comprises a black matrix, and an orthographic projection of the supporting members on a plane where the display panel is located falls within an orthographic projection of the black matrix on the plane where the display panel is located.

16. The touch display panel according to claim 15, wherein the supporting members are arranged in a grid shape.

17. The touch display panel according to claim 11, wherein a second accommodation space and a third accommodation space that are sequentially connected to the first accommodation space are provided in the frame, and the second accommodation space is communicated with and disposed in a same layer as the first accommodation slot and the second accommodation slot, respectively; and the transparent layer is disposed in the second accommodation space, and the protective layer is disposed in the third accommodation space.

18. The touch display panel according to claim 11, wherein a hardening layer is disposed on a side of the protective layer facing away from the display panel.

19. The touch display panel according to claim 11, further comprising a light-shielding ring disposed between the protective layer and the frame.

20. The touch display panel according to claim 10, wherein the frame comprises a first sidewall, a second sidewall, a third sidewall, and a fourth sidewall that are connected end to end in sequence, the first sidewall is disposed opposite to the third sidewall, and the second sidewall is disposed opposite to the fourth sidewall;

the first accommodation slot is opened in the first sidewall and the second sidewall, and the second accommodation slot is opened in the third sidewall and the fourth sidewall; and two of the infrared emitting modules are disposed in the two first accommodation slots in a one-to-one correspondence, and two of the infrared receiving modules are disposed in the two second accommodation slots in a one-to-one correspondence.

* * * * *